United States Patent
Huang et al.

(10) Patent No.: US 9,626,014 B2
(45) Date of Patent: Apr. 18, 2017

(54) TOUCH DISPLAY PANEL AND MANUFACTURING METHOD THEREOF

(71) Applicant: Chunghwa Picture Tubes, LTD., Taoyuan (TW)

(72) Inventors: Yao-Li Huang, Pingtung County (TW); Meng-Chi Liou, Taoyuan County (TW); Jiun-Jr Huang, Yilan County (TW)

(73) Assignee: Chunghwa Picture Tubes, LTD., Taoyuan (TW)

( * ) Notice: Subject to any disclaimer, the term of this patent is extended or adjusted under 35 U.S.C. 154(b) by 148 days.

(21) Appl. No.: 13/970,623

(22) Filed: Aug. 20, 2013

(65) Prior Publication Data
US 2014/0362303 A1 Dec. 11, 2014

(30) Foreign Application Priority Data

Jun. 7, 2013 (TW) .............................. 102120359 A (51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0412* (2013.01); *G06F 2203/04103* (2013.01); *Y10T 29/49105* (2015.01)

(58) Field of Classification Search
CPC .......... G06F 3/041; G06F 2203/04111; G06F 2203/04103; Y10T 29/49105
USPC ....................................................... 345/173
See application file for complete search history.

(56) References Cited

U.S. PATENT DOCUMENTS

2010/0149117 A1* 6/2010 Chien et al. ................. 345/173
2013/0033439 A1 2/2013 Kim et al.

FOREIGN PATENT DOCUMENTS

| CN | 101681221 | 3/2010 |
|---|---|---|
| CN | 201611416 | 10/2010 |
| CN | 102841718 | 12/2012 |
| CN | 202948433 | 5/2013 |
| CN | 202976049 | 6/2013 |
| TW | 201133072 | 10/2011 |
| TW | 201217863 | 5/2012 |
| TW | 201227835 | 7/2012 |
| WO | 2012118038 | 9/2012 |

OTHER PUBLICATIONS

"Office Action of Taiwan Counterpart Application", issued on Aug. 13, 2015, p. 1-p. 8.
"Office Action of China Counterpart Application", issued on Aug. 28, 2015, p. 1-p. 10.
"Office Action of Taiwan Counterpart Application", issued on Dec. 25, 2015, p. 1-p. 8.

* cited by examiner

*Primary Examiner* — Gustavo Polo
(74) *Attorney, Agent, or Firm* — Jianq Chyun IP Office (57) ABSTRACT

A touch display panel including an active device array substrate, a display medium and an opposite substrate is provided. The active device array substrate includes a substrate, a pixel array and a touch sensing layer. The pixel array is disposed on the substrate. The touch sensing layer includes a plurality of first sensing pads disposed on the pixel array and a plurality of bridge conductors embedded in the pixel array. The first sensing pads and the bridge conductors are electrically connected so as to form a plurality of first sensing series.

6 Claims, 12 Drawing Sheets

TOUCH DISPLAY PANEL AND MANUFACTURING METHOD THEREOF

CROSS-REFERENCE TO RELATED APPLICATION

This application claims the priority benefit of Taiwan application serial no. 102120359, filed on Jun. 7, 2013. The entirety of the above-mentioned patent application is hereby incorporated by reference herein and made a part of this specification.

BACKGROUND OF THE INVENTION

Field of the Invention

The invention relates to a touch display panel and a manufacturing method thereof, and more particularly to an in-cell type touch display panel and a manufacturing method thereof.

Description of Related Art

Touch panels can substantially be divided into added-on types, on-cell types and in-cell types according to an arrangement relationship between a touch panel and a display panel. Typically, the added-on type touch panels are formed by manufacturing a touch device on a substrate to form a touch panel, and then attaching the touch panel on an outer surface of a display panel. The on-cell type touch panel has a touch device being integrated onto a display panel. The in-cell type touch panel, on the other hand, has a touch device being directly integrated into a display panel. In comparison with the added-on type touch panels, the on-cell type touch panels and the in-cell type touch panel are perfectly beneficial for accomplishing thinness and lightness of displays.

Nevertheless, regardless of the added-on type, on-cell type or in-cell type touch panel, several photo-mask processes have to be further applied to a contemporary structure of the display panel to complete a design of a touch sensing layer of a touch panel so as to form a touch display panel. Therefore, at present, it requires many photo-mask manufacturing processes to complete a manufacture of the touch display panel.

SUMMARY OF THE INVENTION

The invention provides an active device array substrate having a touch sensing layer so as to provide a driving function and a touch sensing function at the same time.

The invention provides a manufacturing method of an active device array substrate, in which a manufacture of a touch sensing layer is integrated in a manufacturing process of a contemporary active device array layer.

The invention provides a touch display panel, which includes the aforesaid active device array substrate.

The invention provides an active device array substrate, which includes a substrate, a pixel array and a touch sensing layer. The pixel array is disposed on the substrate. The touch sensing layer includes a plurality of first sensing pads disposed on the pixel array and a plurality of bridge conductors embedded in the pixel array. The first sensing pads and the bridge conductors are electrically connected so as to form a plurality of first sensing series.

The invention further provides a manufacturing method of an active device array substrate, which includes the following steps. First, a pixel array and a plurality of bridge conductors are formed on the substrate, wherein the bridge conductors are embedded in the pixel array. Next, a plurality of first sensing pads are formed on the pixel array, wherein the first sensing pads and the bridge conductors are electrically connected to form a plurality of first sensing series.

The invention further provides a touch display panel, which includes the aforesaid active device array substrate, a display medium and an opposite substrate, wherein the display medium is disposed between the active device array substrate and the opposite substrate.

In an embodiment of the invention, the touch display panel further includes a shielding conductive layer. The shielding conductive layer is disposed on the touch sensing layer, and is in direct contact with the touch sensing layer.

In an embodiment of the invention, the touch display panel further includes a shielding conductive layer. The shielding conductive layer overlaps with data lines and scan lines.

In light of the above, the invention integrates the manufacture of the touch sensing layer into the manufacturing process of the pixel array, so as to manufacture the active device array substrate having both touch sensing function and driving function at the same time through fewer photo-mask manufacturing processes. Accordingly, the manufacture of the touch sensing layer can be completed without further increasing numbers of photo-masks, and manufacturing costs of the touch display panel can be lowered.

To make the aforesaid features and advantages of the invention more comprehensible, several embodiments accompanied with drawings are described in details as follows.

DESCRIPTION OF EMBODIMENTS

FIGS. 1A to 1G are schematic views illustrating a flowing process of manufacturing an active device array substrate according to an embodiment of the invention, wherein FIGS. 1A to 1G are top views. First, referring to FIG. 1A, a first conductive layer C1 is formed on a substrate 102. The first conductive layer C1 includes a plurality of scan lines SL, a plurality of gates G and a plurality of bridge conductors B1. Each of the scan lines SL extends along a first direction D1. An extending direction of the bridge conductor B1 is substantially the same as the extending direction of the scan lines SL. Thus, each of the bridge conductors B1 substantially extends along the first direction D1. A material of the first conductive layer C1 is, for example, a metal, a transparent conductive material, any other suitable conductive material or stacked layers of the aforesaid materials.

Figure 1A:
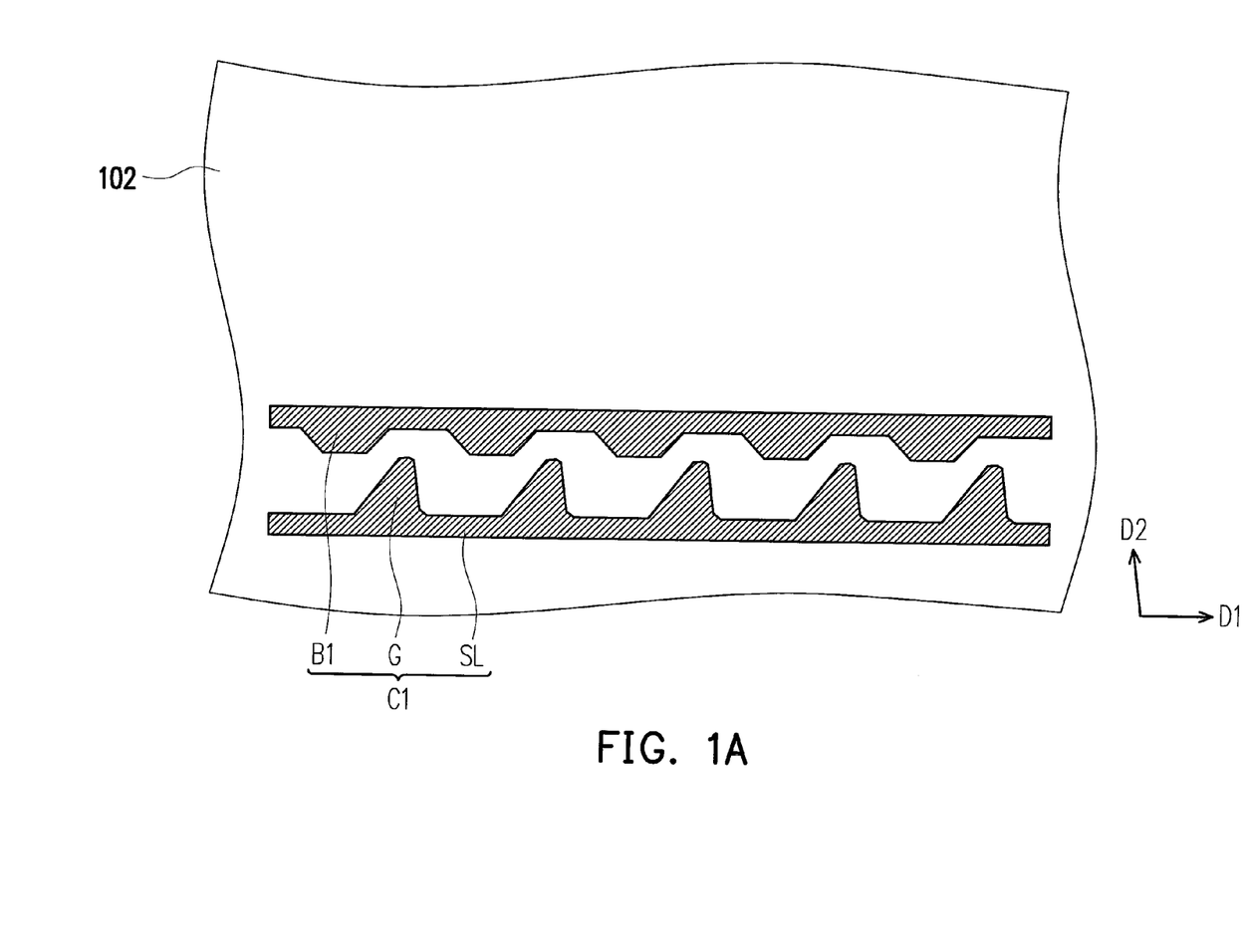
FIGS. 1A to 1G are schematic views illustrating a flowing process of manufacturing an active device array substrate according to an embodiment of the invention.
Figure 1B:
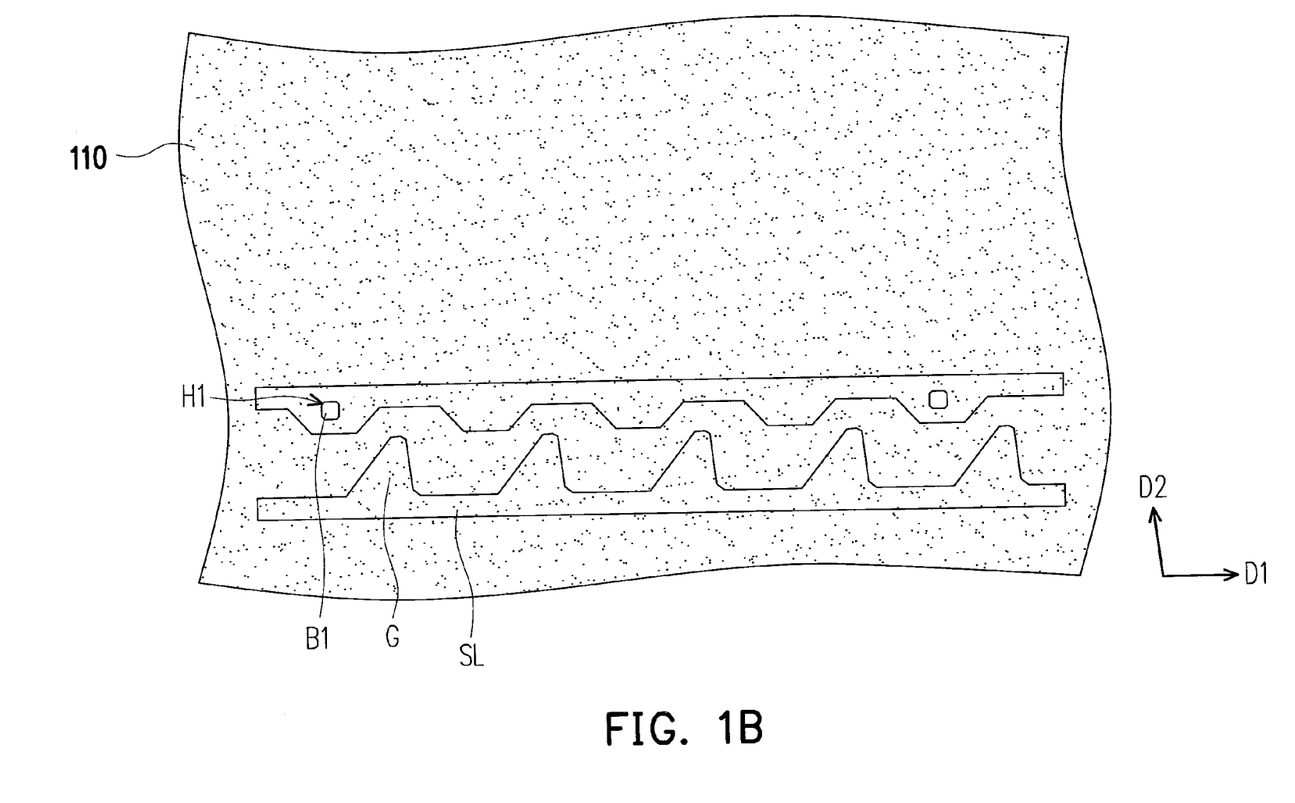

Next, referring to FIG. 1B, a first patterned insulating layer 110 is formed on the substrate 102. The first patterned insulating layer 110 covers the substrate 102 and the first conductive layer C1. The first patterned insulating layer 110 has a plurality of first openings H1, and the first openings H1 expose the bridge conductors B1. A material of the first patterned insulating layer 110 is, for example, silicon nitride, silicon oxide or any other suitable insulating material.

Figure 1C:
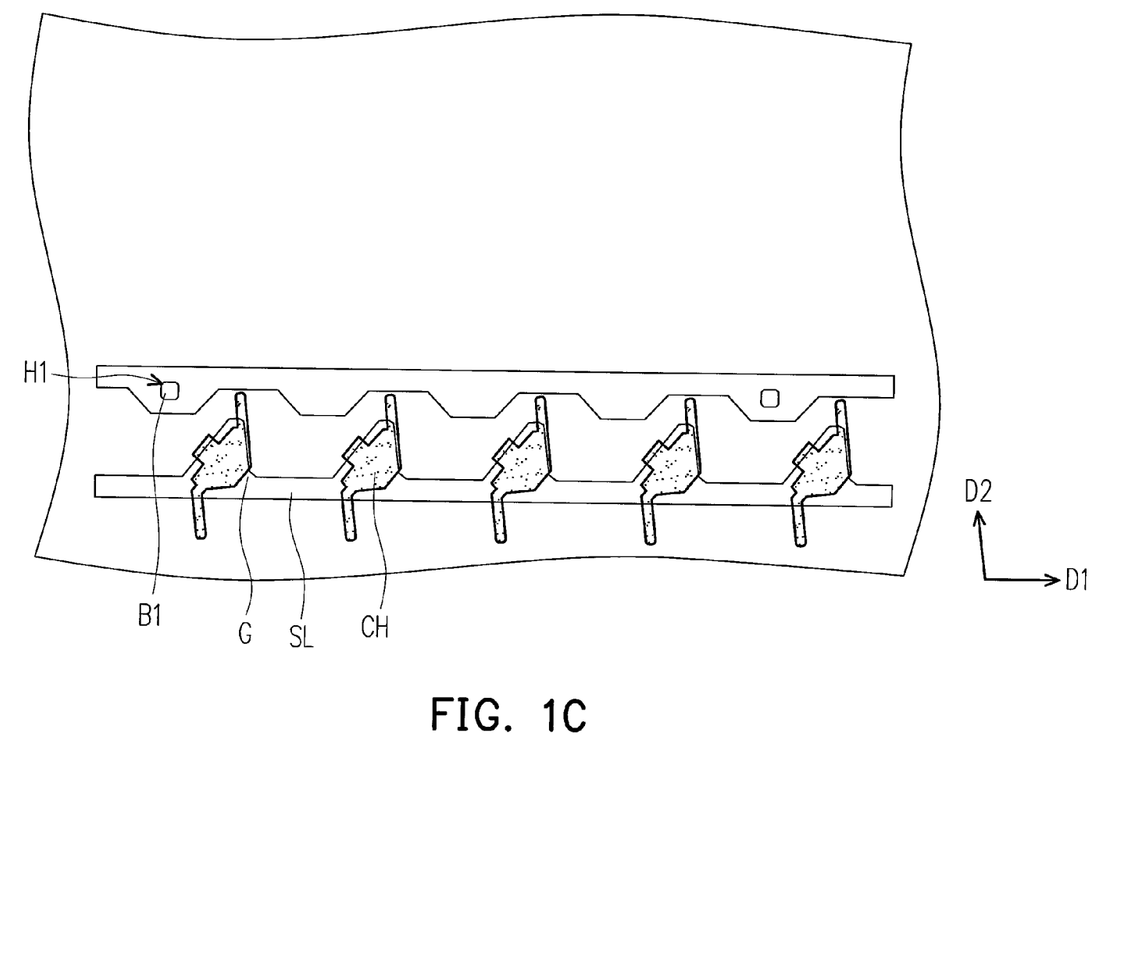

Thereafter, referring to FIG. 1C, a plurality of channel layers CH are formed on the first patterned insulating layer 110. The channel layers CH are, for example, semiconductor material layers. The channel layers CH cover the gates G.

Figure 1D:
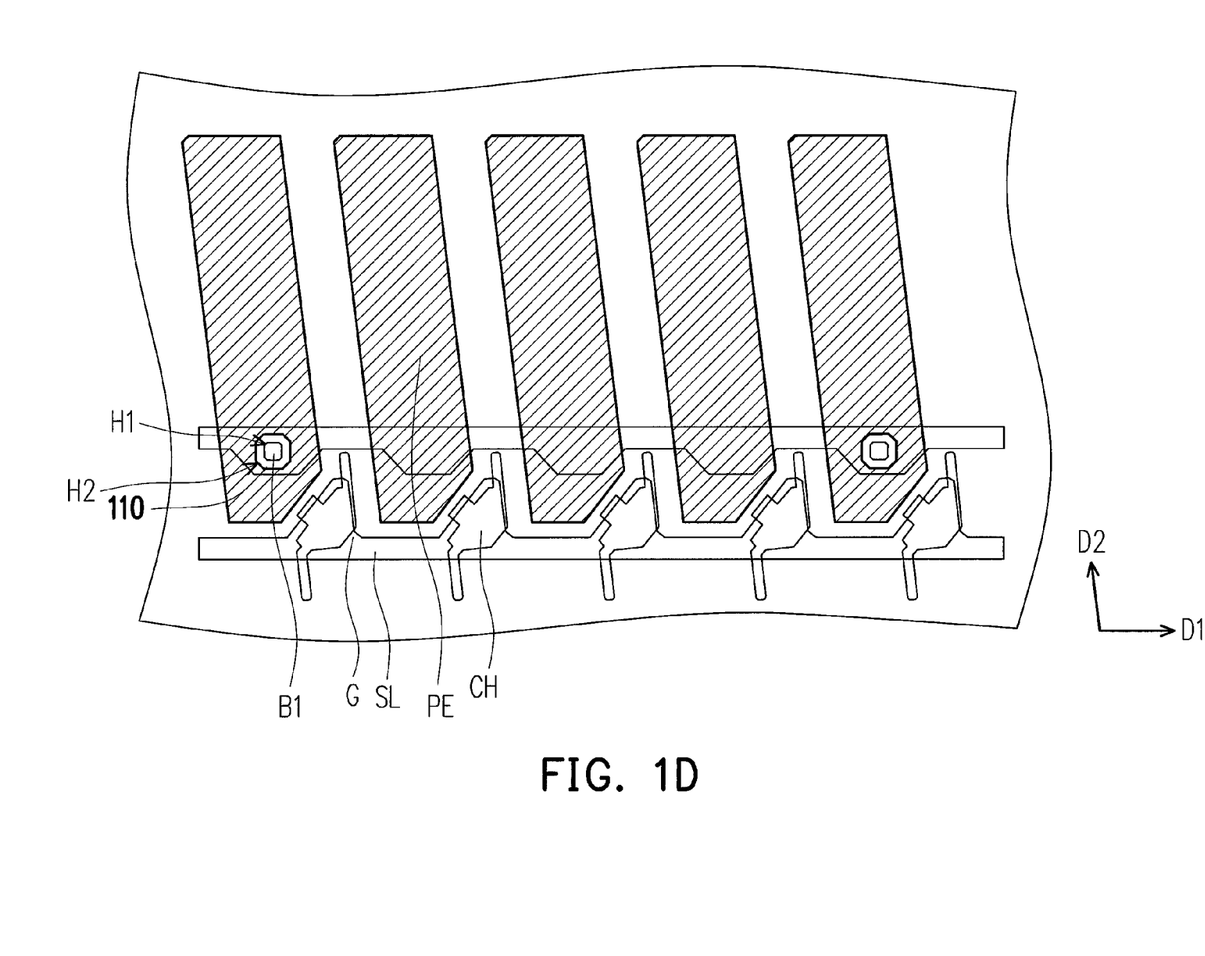

Subsequently, referring to FIG. 1D, a plurality of pixel electrodes PE are formed on the first patterned insulating layer 110, wherein a part of the pixel electrodes PE have a second opening H2. The second opening H2 exposes the first opening H1 and exposes the first patterned insulating layer 110 at a periphery of the first opening H1, and a boundary of the second opening H2 must be larger than a boundary of the first opening H1. Arrangements of the second openings H2 in the pixel electrodes PE can be determined based on design demands. A material of the pixel electrode is, for example, a transparent metal oxide, any other suitable transparent conductive material or any other suitable conductive material.

Figure 1E:
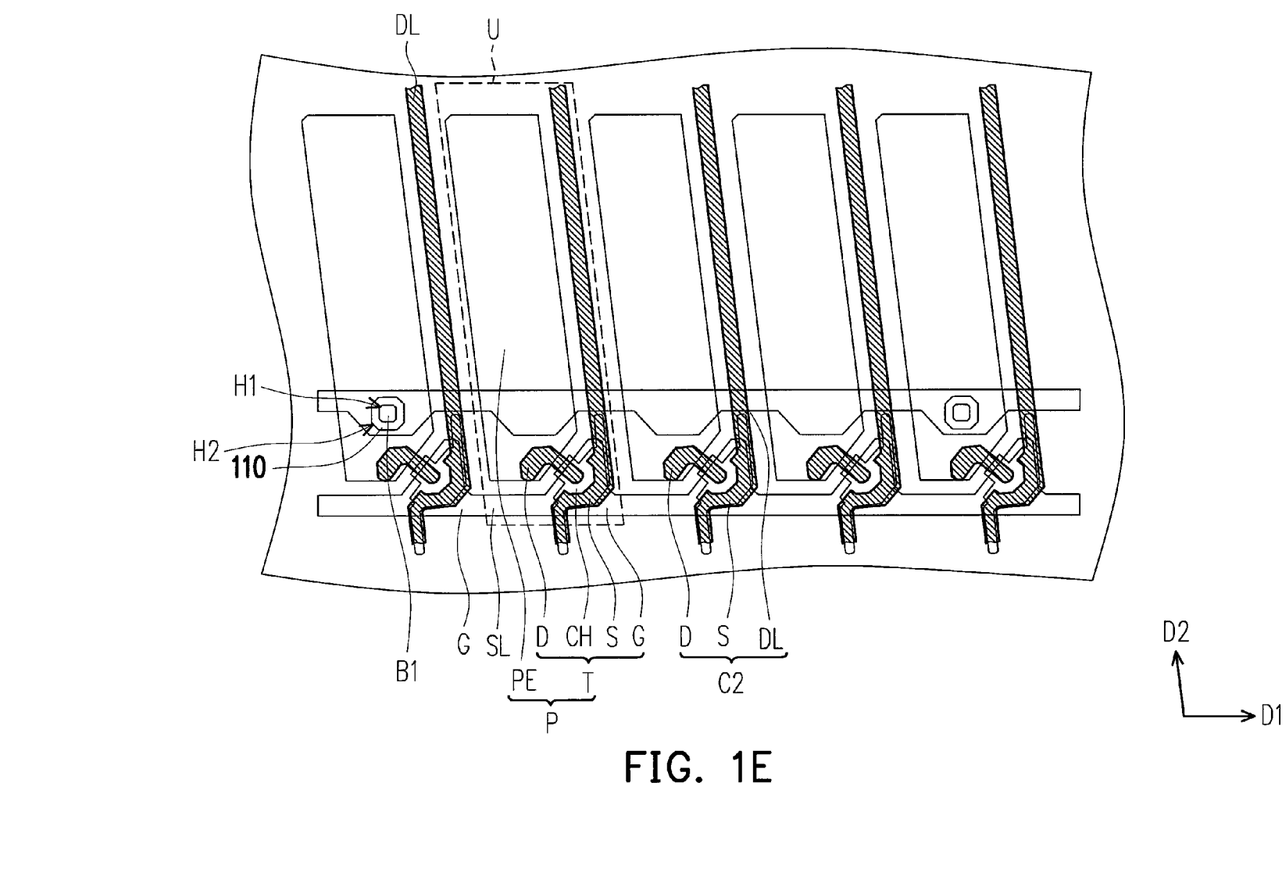

Next, referring to FIG. 1E, a second conductive layer C2 is formed. The second conductive layer C2 includes a source S, a drain D and a plurality of data lines DL. The source S is electrically connected to the data line DL. The drain D covers a part of the pixel electrode PE, and is electrically connected to the pixel electrode PE. The gate G, the channel layer CH, the source S and the drain D substantially constitute an active device T. The active device T is electrically connected to the scan line SL and the data line DL, and the active device T is electrically connected to the pixel electrode PE to form a sub-pixel unit P. Each of the data lines DL extends along a second direction D2. The scan lines SL and the data lines DL are intersected to define a plurality of pixel areas U. The scan lines SL and the data lines DL are not disposed in parallel. In other embodiments, the scan lines SL and the data lines DL may be disposed perpendicularly. One sub-pixel unit P is, for example, correspondingly disposed in each of the pixel areas U. A material of the second conductive layer C2 is, for example, the same as the material of the first conductive layer C1. In consideration of electrical conductivity, the materials of the first conductive layer C1 and the second conductive layer C2 are, preferably, metal materials.

Figure 1F:
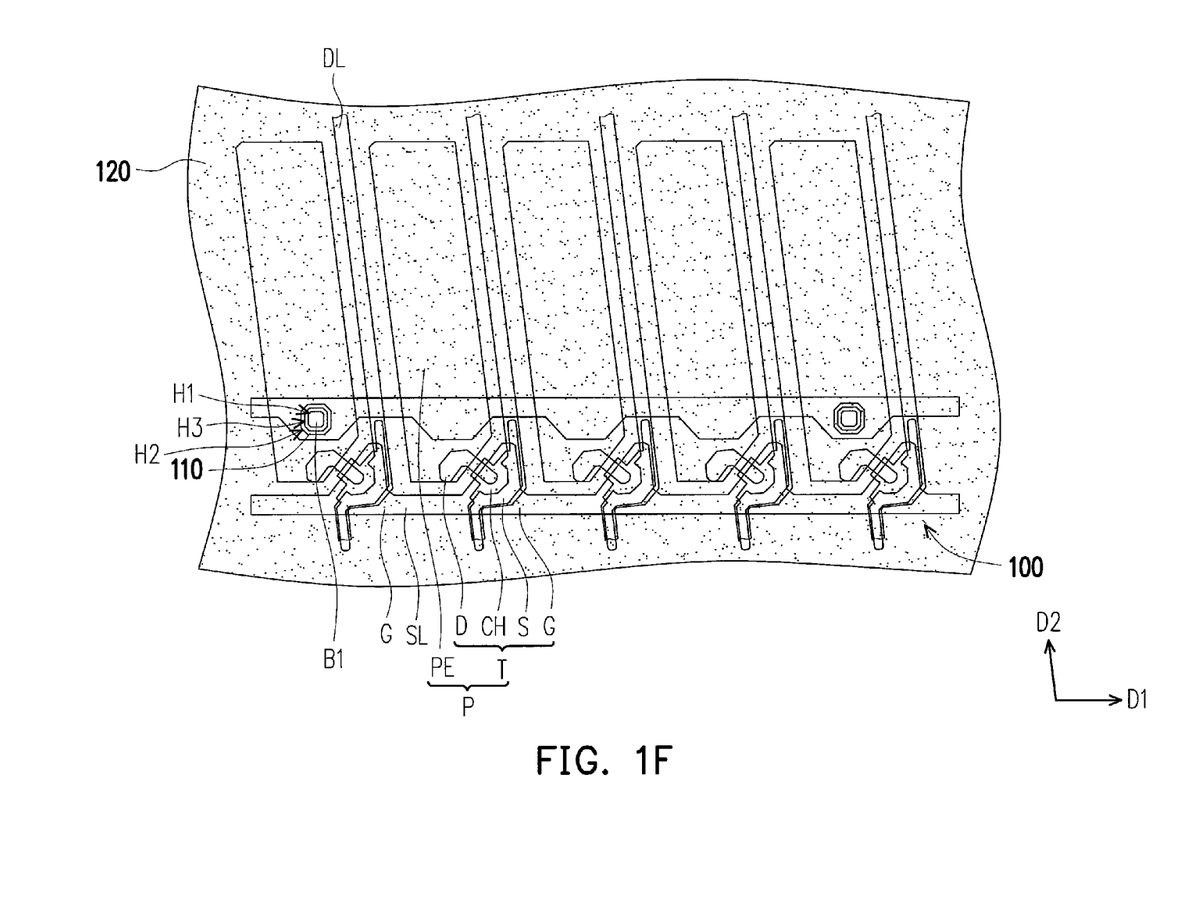

Next, referring to FIG. 1F, a second patterned insulating layer 120 is formed. The second patterned insulating layer 120 covers the first patterned insulating layer 110, the pixel electrodes PE and the second conductive layers C2. The second patterned insulating layer 120 has a plurality of third openings H3. A boundary of the third opening H3 is, for example, located between the boundary of the first opening H1 and the boundary of the second opening H2. The second patterned insulating layer 120 is partially filled in the second opening H2 to cover a sidewall of the pixel electrode PE located at a periphery of the second opening H2. In other words, the third opening H3 of the second patterned insulating layer 120 exposes the bridge conductor B1 and a part of the first patterned insulating layer 110. In other embodiments, the boundary of the third opening H3 can also be aligned to the boundary of the first opening H1, such that the third opening H3 only exposes the bridge conductor B1. A material of the second patterned insulating layer 120 is, for example, silicon nitride, silicon oxide or any other suitable insulating material. Then, a pixel array 100 and the plurality of the bridge conductors B1 are manufactured completely, wherein the pixel array 100 substantially consists of the scan lines SL, the data lines DL and the sub-pixel units P.

Figure 1G:
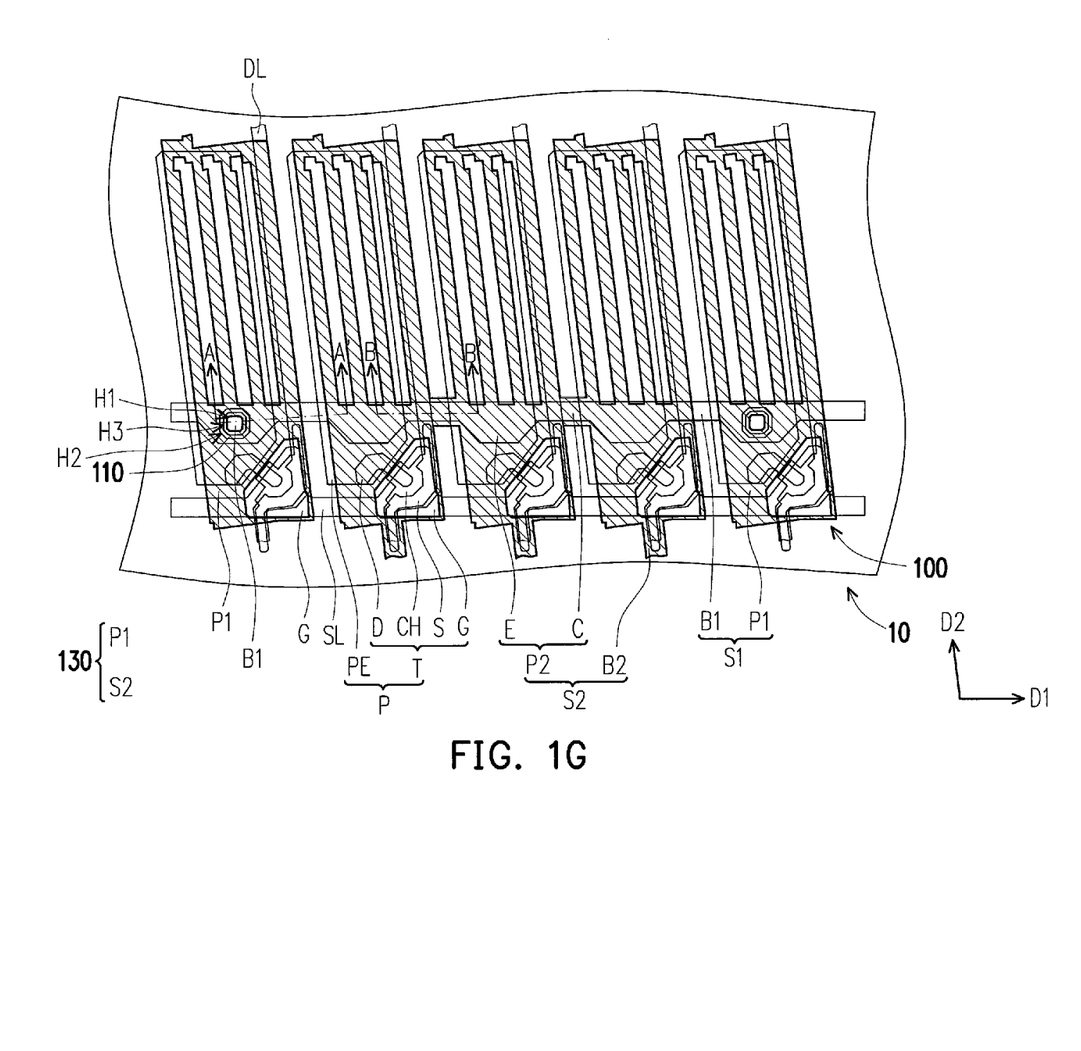

Next, referring to FIG. 1G, a touch sensing layer 130 is formed on the pixel array 100. The touch sensing layer 130 includes a plurality of first sensing pads P1 and a plurality of second sensing series S2. The first sensing pads P1 are disposed in the sub-pixel units P having the first openings H1, the second openings H2 and the third openings H3. Further, the sensing pads P1 are filled in the first openings H1, the second openings H2 and the third openings H3, and are electrically connected to the bridge conductors B1 to form a plurality of first sensing series S1. In other words, the first sensing series S1 is, for example, formed by serially connecting the first sensing pad P1 disposed on the pixel array 100 and the bridge conductor B1 embedded in the pixel array 100. The first sensing series S1 and the second sensing series S1 are intersected and electrically insulated from each other. A material of the touch sensing layer 130 is, for example, a transparent metal oxide, any other suitable transparent conductive material or any other suitable conductive material. Notably, other than being used for a touch sensing function, the first sensing pads P1 and the second sensing series S2 disposed on the pixel array 100 can further be used as common electrodes E, which can couple with the pixel electrodes PE to form storage capacitors. Accordingly, an active device array substrate 10 of the present embodiment can finish manufacturing the first sensing series S1 and the second sensing series S2 when manufacturing the pixel array 100 and the common electrodes E at the same time. In other words, the present embodiment can manufacture the active device array substrate 10 having both a driving function and a touch sensing function simultaneously with fewer photo-mask manufacturing processes.

Figure 2:
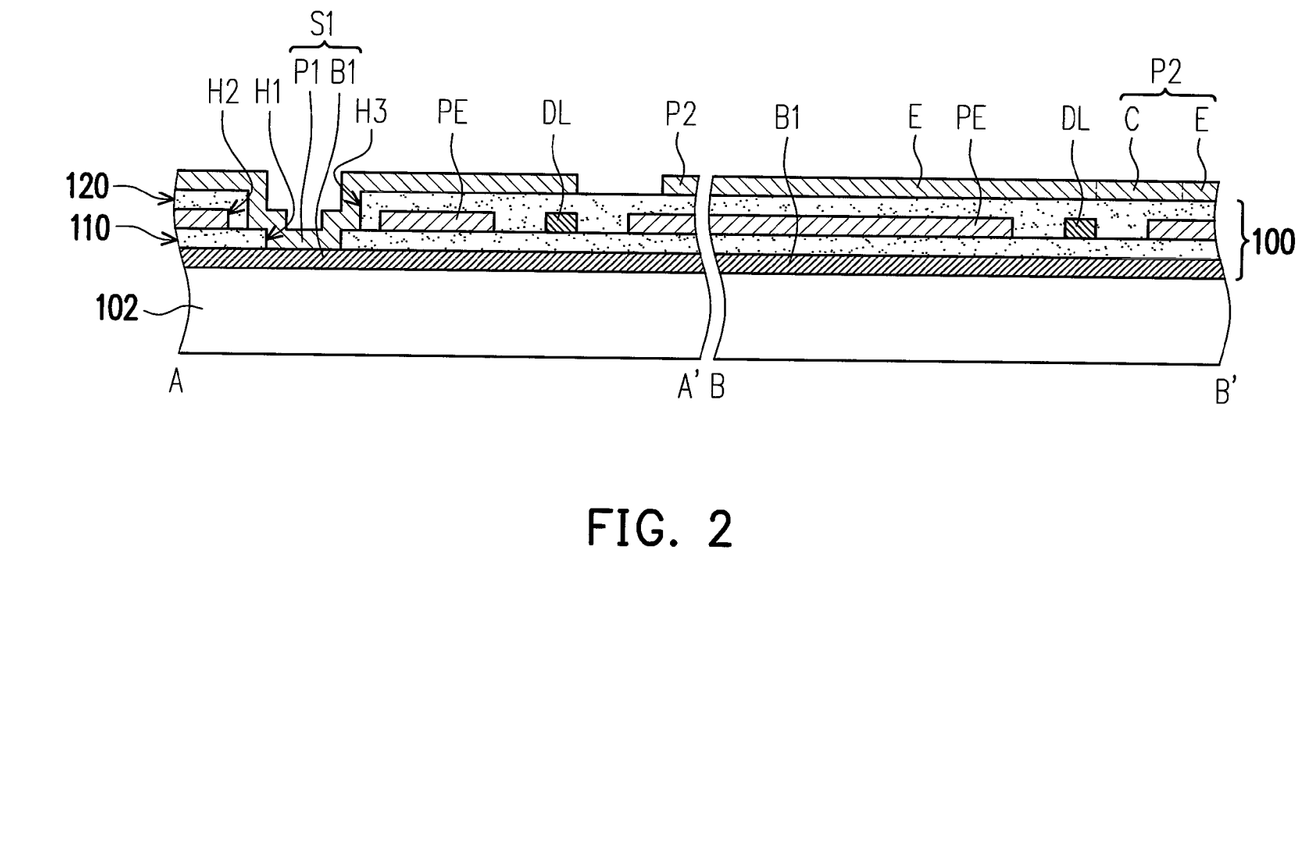
FIG. 2 is a schematic cross-sectional view along lines A-A' and B-B' depicted in FIG. 1G.
Figure 3:
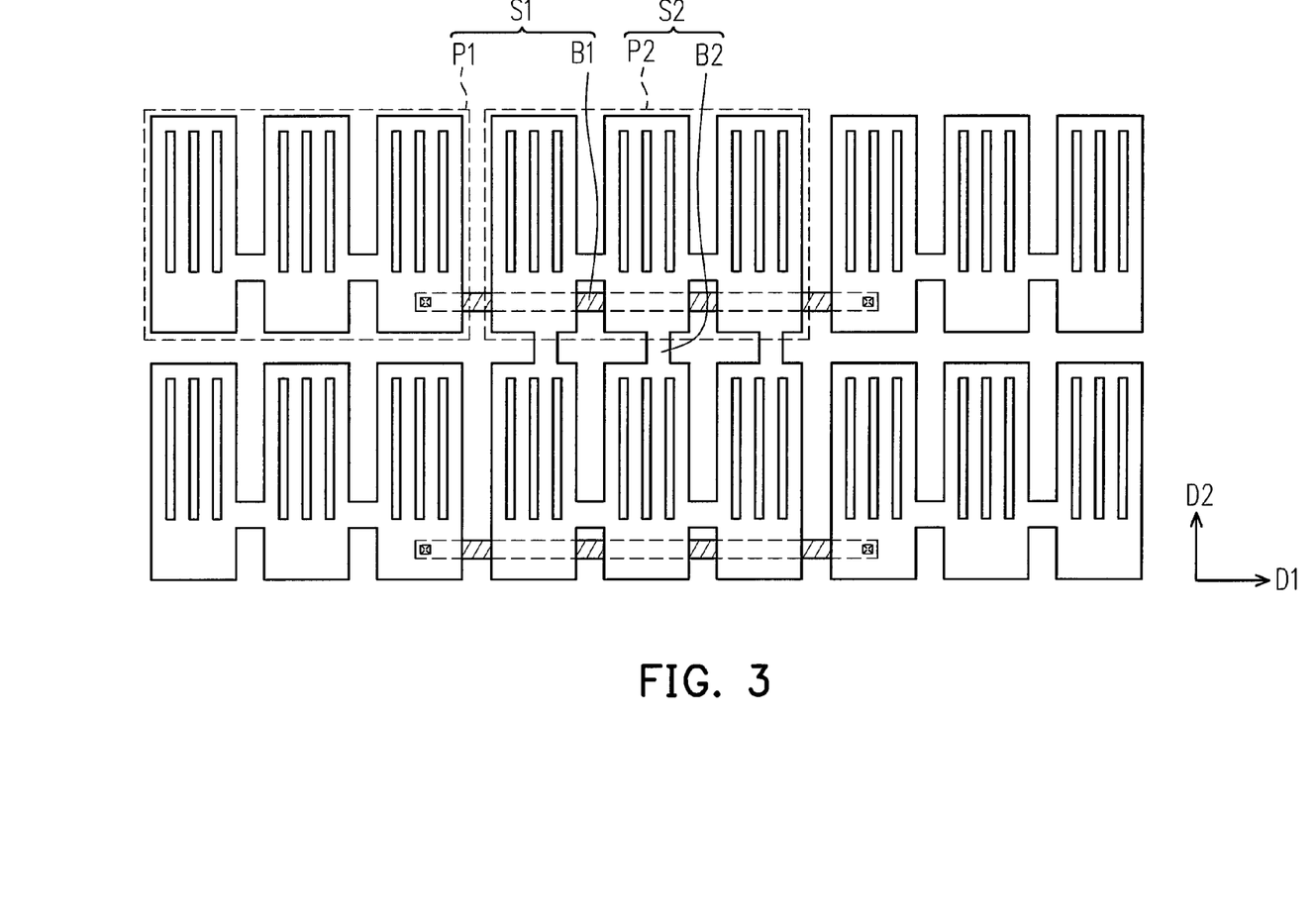
FIG. 3 is a top view of the first sensing series and the second sensing series depicted in FIG. 1G.

FIG. 2 is a schematic cross-sectional view along Lines A-A' and B-B' depicted in FIG. 1G. FIG. 3 is a top view of a first sensing series S1 and a second sensing series S2 depicted in FIG. 1G. Referring to FIG. 1G, FIG. 2 and FIG. 3. The touch sensing layer 130 of the present embodiment includes the first sensing pads P1 of the first sensing series S1 and the second sensing series S2. The first sensing series S1 extends along the first direction D1 The second sensing series S2 extends along the second direction D2. The first sensing pad P1 is disposed on the second patterned insulating layer 120 of the pixel array 100. The bridge conductors B1 are disposed on the substrate 102, and each of the bridge conductors B1 extends, for example, along the first direction D1 and crosses over a second sensing pad P2 of one of the second sensing series S2.

Specifically, the sub-pixel units P including the first sensing pads P1 have openings (such as the first opening H1, the second opening H2 and the third opening H3), such that the first sensing pad P1 is connected to the bridge conductor B1 disposed on the substrate 102 through the openings. On the contrary, the sub-pixel units P including the second sensing pads P2 do not have the openings. Thus, the second sensing pad P2 is not connected to the bridge conductor B1. Accordingly, the first sensing series S1 and the second sensing series S2 are electrically insulated from each other. It should noted that the second patterned insulating layer 120 covers the pixel electrode PE located at the second opening H2. Therefore, a short circuit phenomenon caused by a contact to the pixel electrode PE from the first sensing pad P1 can be avoided when the first sensing pad P1 is filled in the openings (H1, H2 and H3).

In the present embodiment, an area occupied by each of the first sensing pads P1 or each of the second sensing pads P2 substantially corresponds to approximately three pixel areas U. Specifically, the first sensing pad P1 is, for example, formed by connecting three common electrodes E in three adjacent sub-pixel units P, wherein the two adjacent common electrodes E are connected by a connecting portion C. Nevertheless, the invention is not limited thereto. In other embodiments, the first sensing pad P1 can be formed by one common electrode E, or the first sensing pad P1 can also be formed by two or more than three common electrodes E connecting to each other. Similarly, the second sensing pad P2 can be formed by one common electrode E, or the second sensing pad P2 can also be formed by two or more than three common electrodes E connecting to each other. Moreover, in the present embodiment, the common electrodes E are disposed on the pixel array 100. Consequently, a pixel aperture ratio is high and a storage capacitance is large. As a result, a flickering phenomenon is reduced on display images of a touch display panel 1.

Figure 4:
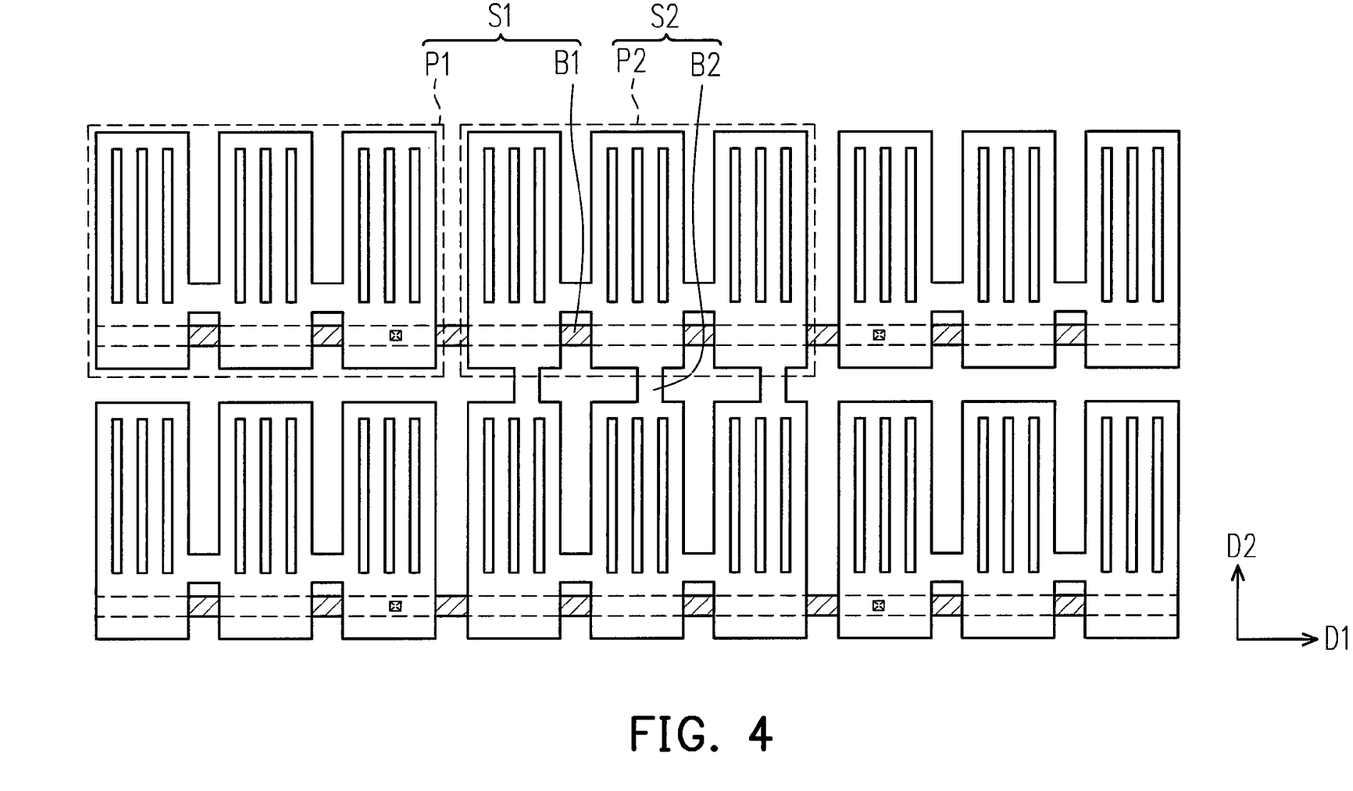
FIG. 4 is a top view of the first sensing series and the second sensing series according to another embodiment of the invention.

In the embodiment of FIG. 3, the bridge conductor B1 is, for example, disposed only below where the opening will be formed and below the second sensing series S2 over which the bridge conductor B1 will cross. In other words, the plurality of bridge conductors B1 are disposed in the same first sensing series S1 to connect each of the first sensing pads P1. Nevertheless, the invention is not limited thereto. FIG. 4 is a top view of the first sensing series S1 and the second sensing series S2 according to another embodiment of the invention. Referring to FIG. 1G and FIG. 4. In consideration of simplifying a design of a photo-mask pattern, the bridge conductors B1 can also be designed to be disposed below all of the first sensing pads P1 of the same first sensing series S1 and below the second sensing series S2 over which the bridge conductors B1 cross. In other words, only one strip bridge conductor B1 is disposed in the same first sensing series S1.

Figure 5:
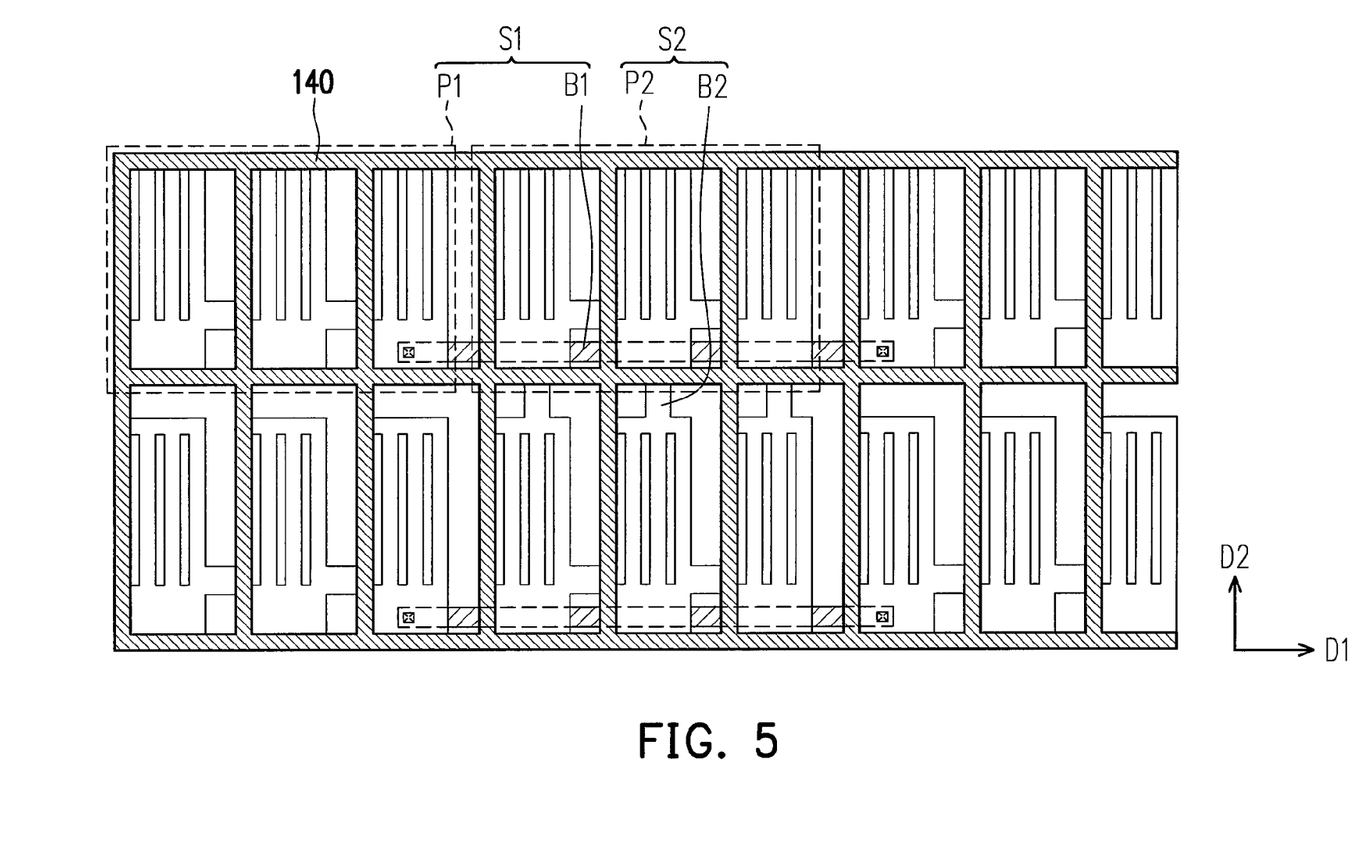
FIG. 5 is a top view of the first sensing series and the second sensing series according to another embodiment of the invention.

FIG. 5 is a top view of the first sensing series S1 and the second sensing series S2 according to another embodiment of the invention. Referring to FIG. 1G and FIG. 5. In the present embodiment, a shielding conductive layer 140 can also be formed on the first sensing pad P1 and the second sensing series S2. The shielding conductive layer 140 is in direct contact with the first sensing pad P1 and the second sensing series S2. Thus, the conductive resistances of the first sensing pad P1 and the second sensing series S2 can be lowered. In the present embodiment, the shielding conductive layer 140 is, for example, disposed by selectively corresponding to the data lines DL and the scan lines SL. Specifically speaking, the shielding conductive layer 140 may overlap with the data lines DL and the scan lines SL, and the shielding conductive layer 140 may completely cover the data lines DL and the scan lines SL to shield the data lines DL and the scan lines SL, so as to prevent users from observing the data lines DL and the scan lines SL. Accordingly, when the active device array substrate set in the present embodiment is used for manufacturing a touch display panel, a black matrix is not needed to be disposed on an opposite substrate. Further, in a premise that disposing a black matrix is no longer needed, a process for manufacturing a planar layer prior to manufacturing the black matrix can be eliminated. Therefore, steps for manufacturing a touch display panel can further be simplified.

In the aforesaid embodiment, the bridge conductors B1 and the scan lines SL are manufactured together, and the extending direction of the bridge conductors B1 is substantially parallel to the extending direction of the scan lines SL. Nevertheless, the invention is not limited thereto. As long as the first sensing pad P1 in the first sensing series S1 is disposed on the pixel array 100 and the bridge conductor B1 is embedded in the pixel array 100, such arrangement is the spirit which the invention seeks to protect. For instance, the bridge conductors B1 can also be manufactured together with the data lines DL or be manufactured together with the pixel electrodes PE.

Figure 6:
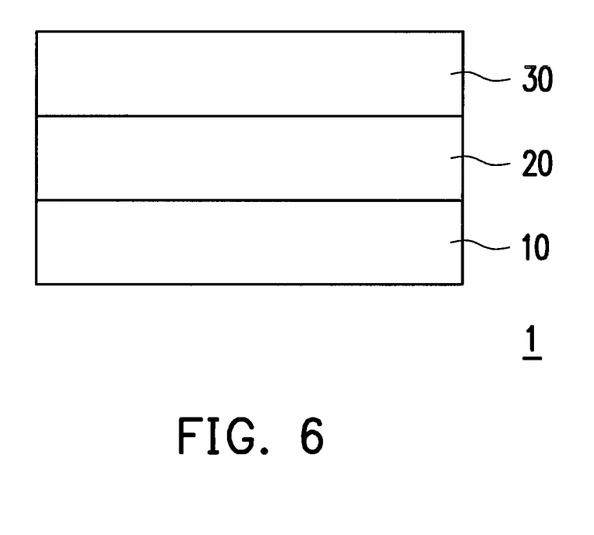
FIG. 6 is a schematic cross-sectional view of a touch display panel according to an embodiment of the invention.

FIG. 6 is a schematic cross-sectional view of a touch display panel according to an embodiment of the invention. A touch display panel 1 includes an active device array substrate 10, a display medium 20 and an opposite substrate 30, wherein the display medium 20 is disposed between the active device array substrate 10 and the opposite substrate 30. The display medium 20 contains, for example, a liquid crystal display material, an electro-phoretic display material, an electrowetting display material or any other suitable display material. It should be noted that the aforesaid varieties of the display medium 20 is only exemplary, and the invention does not limit varieties of the display medium 20.

In summary, the first sensing series of the invention is formed by connecting the bridge conductors to two adjacent first sensing pads, and the bridge conductors are embedded in the pixel array and crossing over the second sensing series. A manufacture of the bridge conductors can be integrated into a manufacturing process of the pixel array, as so to manufacture the active device array substrate having both a touch sensing function and a driving function at the same time with fewer photo-mask manufacturing processes. Accordingly, a manufacturing process of the touch display panel can be simplified with fewer steps, and costs for manufacturing the touch display panel can be effectively lowered.

What is claimed is:

1. A touch display panel, comprising:
an active device array substrate, comprising:
 a substrate;
 a pixel array disposed on the substrate, the pixel array comprising:
  a plurality of scan lines, the scan lines disposed in parallel to one another on the substrate;
  a plurality of data lines, the data lines disposed in parallel to one another on the substrate, wherein the scan lines and the data lines are intersected to define a plurality of pixel areas; and
  a plurality of sub-pixel units disposed in the pixel areas, each of the sub-pixel units comprising at least one active device and at least one pixel electrode electrically connected to the active device, wherein the active device is electrically connected to the corresponding scan line and the corresponding data line; and
 a touch sensing layer, comprising:
  a plurality of first sensing series, each of the first sensing series comprising a plurality of first sensing pads disposed on the pixel array and a plurality of bridge conductors embedded in the pixel array, wherein the bridge conductors and the scan lines belong to the same film layer, and an extending direction of the bridge conductors is substantially parallel to an extending direction of the scan lines; and
  a plurality of second sensing series, the first sensing series and the second sensing series intersected with each other and electrically insulated from each other, wherein each of the bridge conductors crosses over the second sensing series to electrically connect to two adjacent first sensing pads, wherein the first sensing pads and the second sensing series are coupled with the at least one pixel electrode to form storage capacitors, respectively;

an opposite substrate disposed opposite to the active device array substrate; and a display medium, the display medium sandwiched between the active device array substrate and the opposite substrate.

2. The touch display panel as claimed in claim 1, further comprising a shielding conductive layer disposed on the touch sensing layer, and the shielding conductive layer directly contacting with the touch sensing layer.

3. The touch display panel as claimed in claim 1, further comprising a shielding conductive layer, wherein the shielding conductive layer overlaps with the data line and the scan line.

4. A manufacturing method of a touch display panel, comprising the following steps of:

providing an active device array substrate, comprising:

forming a pixel array on a substrate, comprising:

forming a plurality of scan lines disposed in parallel on the substrate;

forming a plurality of data lines disposed in parallel on the substrate, wherein the scan lines and the data lines are intersected to define a plurality of pixel areas; and forming a plurality of sub-pixel units in the pixel areas, each of the sub-pixel units comprising at least one active device and at least one pixel electrode electrically connected to the active device, wherein the active device is electrically connected to the corresponding scan line and the corresponding data line;

forming a plurality of bridge conductors on the substrate, the bridge conductors embedded in the pixel array, wherein the bridge conductors and the scan lines are formed in a same patterned layer, and an extending direction of the bridge conductors is substantially parallel to an extending direction of the scan lines; and forming a touch sensing layer on the pixel array, the touch sensing layer comprising a plurality of first sensing pads and a plurality of second sensing series, the first sensing pads electrically connected to the bridge conductors to form a plurality of first sensing series, the first sensing series and the second sensing series intersected with each other and electrically insulated from each other, wherein the first sensing pads and the second sensing series are coupled with the at least one pixel electrode to form storage capacitors, respectively; and providing an opposite substrate and a display medium, wherein the display medium is sandwiched between the active device array substrate and the opposite substrate.

5. The manufacturing method of a touch display panel as claimed in claim 4, further comprising forming a shielding conductive layer on the touch sensing layer, wherein the shielding conductive layer is in direct contact with the touch sensing layer.

6. The manufacturing method of a touch display panel as claimed in claim 4, further comprising forming a shielding conductive layer on the touch sensing layer, wherein the shielding conductive layer overlaps with the data line and the scan line.

* * * * *